US005999400A

United States Patent [19]

Belopolsky et al.

[11] Patent Number: 5,999,400

[45] Date of Patent: Dec. 7, 1999

[54] MODULAR PLUG WITH ELECTRONIC COMPONENTS

[75] Inventors: Yakov Belopolsky, Harrisburg, Pa.; Joseph E. Shingara, Columbia, Md.

[73] Assignee: Berg Technology, Inc., Reno, Nev.

[21] Appl. No.: 09/201,058

[22] Filed: Nov. 30, 1998

[51] Int. Cl.[6] ...................................................... H02B 1/00

[52] U.S. Cl. .......................... 361/600; 361/602; 361/603; 361/816; 361/818; 361/822; 174/64; 379/441; 379/442; 379/443; 379/447; 379/457; 439/620; 439/660; 439/701

[58] Field of Search .................................... 361/600–603, 361/807, 816, 813, 822; 174/53, 50.52, 50.53, 50.54, 64; 379/441–443, 447, 457; 439/620, 660, 700, 701

[56] References Cited

U.S. PATENT DOCUMENTS

| | | | |
|---|---|---|---|
| 4,412,715 | 11/1983 | Bogese, II | 439/425 |
| 4,838,811 | 6/1989 | Nakamura et al. | 439/607 |
| 5,580,260 | 12/1996 | Flieger et al. | 439/188 |
| 5,692,925 | 12/1997 | Bogese, II | 439/620 |
| 5,736,910 | 4/1998 | Townsend et al. | 333/181 |
| 5,833,496 | 11/1998 | Hollander et al. | 439/620 |
| 5,851,122 | 12/1998 | Huber et al. | 439/620 |

*Primary Examiner*—Leo P. Picard
*Assistant Examiner*—Boris L. Chervinsky
*Attorney, Agent, or Firm*—Daniel J. Long; M. Richard Page; Brian J. Hamilla

[57] ABSTRACT

A modular plug which has an insulative housing comprising a front wall, a rear wall, a top wall, a bottom wall and a pair of lateral walls which are perpendicularly interposed between the top two bottom walls. There are a plurality of front longitudinal terminal receiving slots in the top wall adjacent the front wall. There is also a cable receiving cavity in the rear wall. A plurality of rear longitudinal terminal contact receiving slots are in the top wall and between the front longitudinal terminal contact receiving slots and the rear wall. A medial component housing cavity is interposed between the front longitudinal terminal contact receiving slots and the rear longitudinal terminal contact receiving slots. There is also a first plurality of conductors, each of which extends from the rear wall of the jack to adjacent a different one of said rear longitudinal contact terminal receiving slots. There is also a first plurality of terminal contacts, each of which is positioned in a different one of said rear longitudinal contact receiving slots and is connected to a separate one of the first plurality of conductors. A second plurality of terminal contacts is positioned is that each of them is in a different one of said front longitudinal terminal contact receiving slots. There is at least one electronic component positioned in the medial component receiving cavity. A second plurality of conductors connects a different one of the first plurality of terminal contacts with one of the electronic components. A third plurality of conductors each of which connects one of the electronic components with a different one of the second plurality of terminal contacts.

36 Claims, 3 Drawing Sheets

MODULAR PLUG WITH ELECTRONIC COMPONENTS

BACKGROUND OF THE INVENTION

1. Field of the Invention

The present invention relates to electrical connectors and more particularly to modular plugs.

2. Brief Description of Prior Developments

There are numerous designs that improve Electromagnetic Compatibility (EMC) of electronic equipment that utilize magnetic and other filtering components when such equipment is connected, for example, through modular telephone connector to the outside network. All known designs are intended to reduce electromagnetic interference (EMI) by using the filtered components on the modular receptacle side of the connector.

There is, therefore, a need for a modular plug having integral components for reducing EMI in equipment with which the plug is used which can be terminated by utilizing common plug terminating fixtures employed by the users and installers.

There is also a need for a modular plug having integral components which can be used for otherwise improving performance or adjusting the capabilities of electronic equipment with which the plug is used.

There is a further need for a modular plug having integral components which can be used to reduce load on internal components of electronic equipment with which the plug is used.

SUMMARY OF THE INVENTION

The present invention is a modular plug comprising an insulative housing comprising a front wall, a rear wall, a top wall, a bottom wall and a pair of lateral walls which are perpendicularly interposed between the top two bottom walls. There are a plurality of front longitudinal terminal receiving slots in the top wall adjacent the front wall. There is also a cable receiving cavity in the rear wall. A plurality of rear longitudinal terminal contact receiving slots are in the top wall and between the front longitudinal terminal contact receiving slots and the rear wall. A medial component housing cavity is interposed between the front longitudinal terminal contact receiving slots and the rear longitudinal terminal contact receiving slots. There is also a first plurality of conductive means, each of which extends from the rear wall of the jack to adjacent a different one of said rear longitudinal contact terminal receiving slots. There is also a first plurality of terminal contacts, each of which is positioned in a different one of said rear longitudinal contact receiving slots and is connected to a separate one of the first plurality of conductive means. A second plurality of terminal contacts is positioned is that each of them is in a different one of said front longitudinal terminal contact receiving slots. There is at least one electronic component positioned in the medial component receiving cavity. A second plurality of conductive means connects a different one of the first plurality of terminal contacts with one of the electronic components. A third conductive means of which connects one of the electronic components with one of the second plurality of terminal contacts.

Also encompassed by the present invention is an arrangement similar to the one described in the foregoing paragraph in which the rear contact and their slots are omitted and a conductive means extends from the cable receiving opening first to an electronic component and then to one of the front terminal contacts.

Also encompassed by the present invention is an arrangement similar to the first embodiment described herein except that there is only one rear terminal contact and receiving slot and only one front terminal contact and receiving slot. Conductive means connects the rear terminal contact with an electronic component and the electronic component with the front terminal contact.

Also encompassed by the present invention is a combination of a modular jack having integral electronic components and an article of electronic equipment. The jack is inserted through a port in exterior enclosure of the equipment to engage a plug mounted on an interior printed circuit board (PCB) having an interior electronic circuit having an electronic circuit with components. The integral electronic components on the jack can serve to improve performance or reduce EMI in the equipment or reduce load on the equipment's internal components. Similarly, a method in which the modular plug with integral electronic components is inserted in the port of the equipment to engage the jack in order to adjust equipment capabilities is within the scope of this invention.

BRIEF DESCRIPTION OF THE DRAWINGS

The present invention is further described with reference to the accompanying drawings in which.

DETAILED DESCRIPTION OF THE PREFERRED EMBODIMENTS

Figure 1:
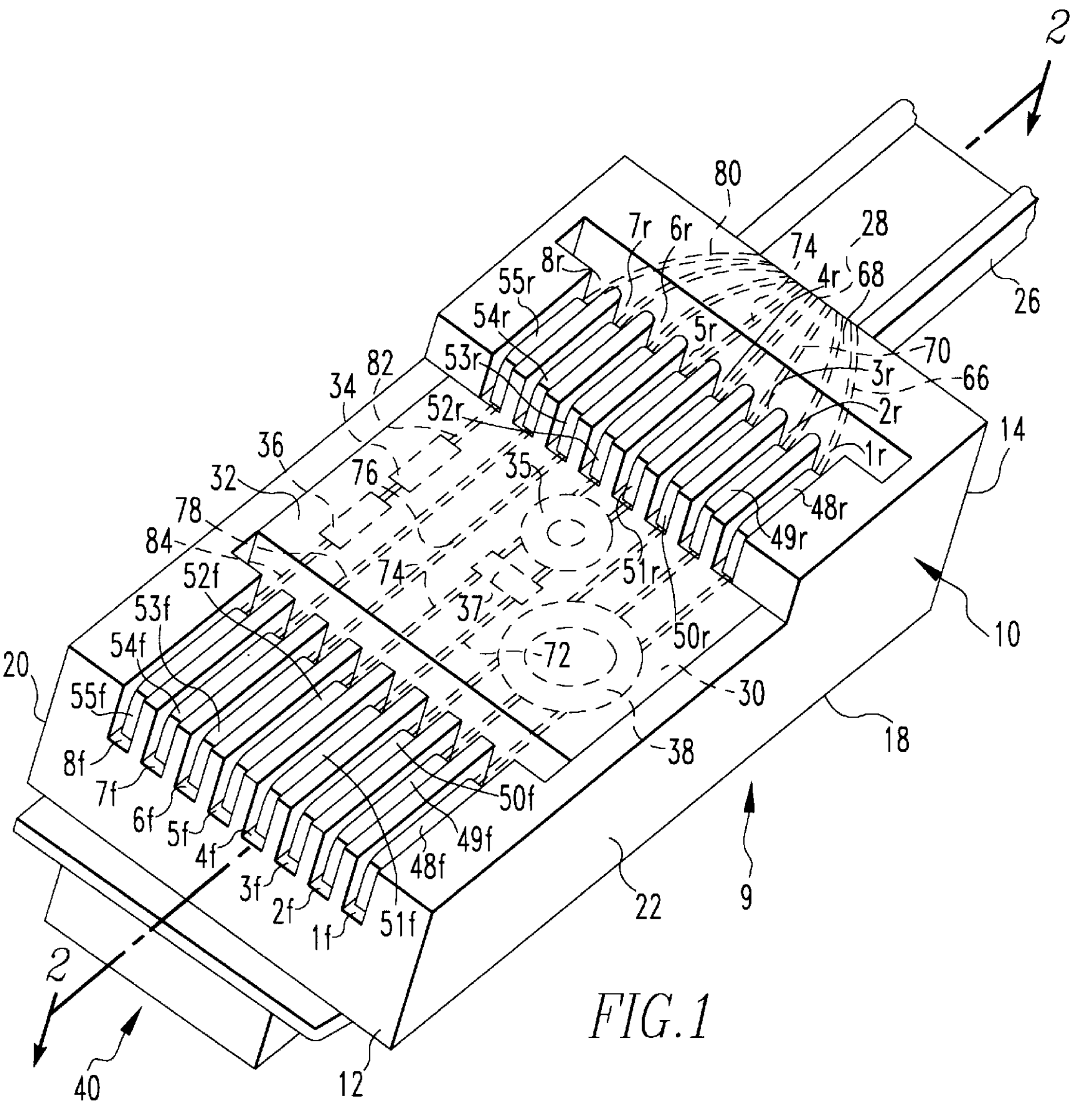
FIG. 1 is a top front perspective view of a preferred embodiment of the modular plug of the present invention.
Figure 2:
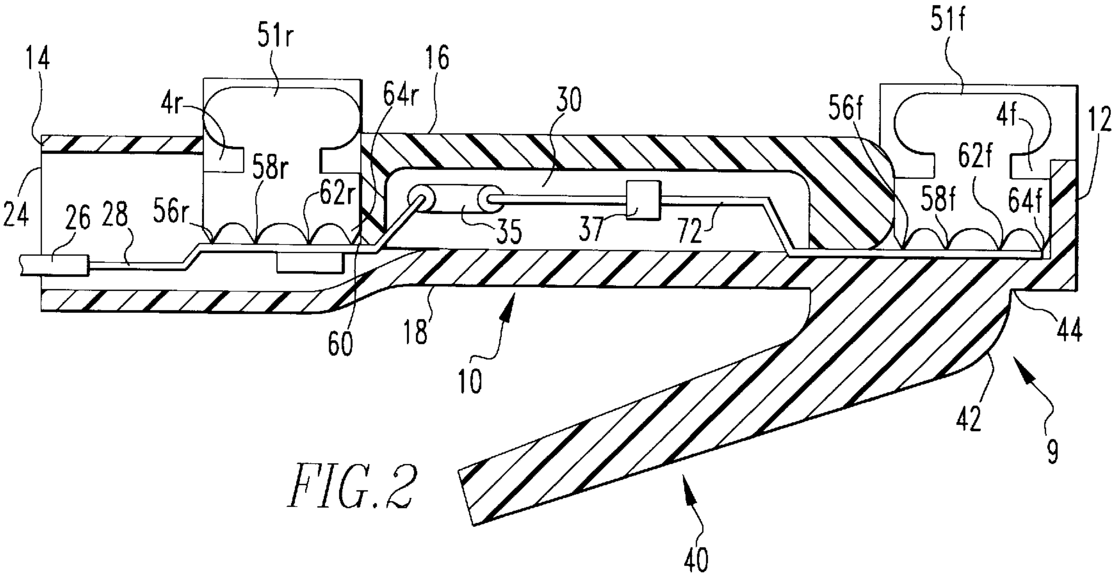
FIG. 2 is a cross section through 2—2 in FIG. 1.

Referring to FIGS. 1–2, the modular plug of the present invention is shown generally at numeral 9. The modular plug 9 has an insulative housing shown generally at numeral 10. This insulative housing has a front wall 12 and a rear side 14. It also has a top wall 16, a bottom wall 18 and opposed lateral walls 20 and 22. In the front wall 12 and top wall 16 there are eight front contact receiving longitudinal slots, 1*f*, 2*f*, 3*f*, 4*f*, 5*f*, 6*f*, 7*f* and 8*f* and eight rear contact receiving longitudinal slots 1*r*, 2*r*, 3*r*, 4*r*, 5*r*, 6*r*, 7*r* and 8*r*. As will be explained in greater detail hereafter, each of these slots contains one terminal contact which is a substantially planar blade. In the rear side 14 there is a cable receiving opening 24 through which a cable 26 passes. This cable includes eight wires as at wire 28. Each of these wires extends respectively to a different one of the rear contact receiving slots as at slot 4*r* in the case of wire 28. Between the front contacts and the rear contacts there is a medial component housing cavity 30. A snap top 32 is superimposed over this medial component housing character, and the cavity holds a plurality of electronic components as at components 34–38. These components may non-exclusively include magnetic components such as common mode chokes and isolation transformers as well as other components such as resistors, capacitors and light emitting diodes (LED's) or combinations of any or all of these named components. As an example, component 34 may an LED, and component 35 may be a common mode choke. Components 36 and 37 may be resistors, and component 38 may be an isolation transformer. Alternately only a single such component may be positioned in the cavity 30. The plug also has a latching arm shown generally at numeral 40 which has a base shoulder 42 and a pivot point 44 to allow movement of the latching arm during engagement with a jack.

There are also a plurality of rear terminal contacts 48*r*–55*r* positioned respectively in each of the rear contact receiving slots 1*r*–8*r*. Similarly, there are a plurality of front rear terminal contacts 48*f*–55*f* positioned respectively in front contact receiving slots 1*f*–8*f*. As is shown in FIG. 2, wire 28 from cable 26 connects to rear contact 51*r* by means of tangs as at tangs 56*r* and 58*r* which pierce the insulation of wire 28 to allow for insulation displacement contact therewith. Another wire segment 60 from common mode choke 35 joins wire 28 under the contact and in similarly contacted by tangs 62*r* and 64*r*. Although not shown, it will be understood that each of the other rear contacts is similarly connected to a separate one of the wires from cable 26. As is particularly shown in FIG. 1, wires 66, 68 and 70 extend from cable 26 to connect respectively with contacts 48*r*, 49*r* and 50*r* in contact receiving slots 1*r*, 2*r*, and 3*r* by means of insulation displacement contact, and from those contacts each of these wires extends first to transformer 38 and then to connect respectively to contacts 48*r*, 49*r* and 50*r* in contact receiving slots 1*f*, 2*f*, and 3*f* by insulation displacement contact. Wire segment 60 extends from contact 51*r* in slot 4*r* to common mode choke 35 and from common mode choke 35 to resistor 37. Wire segment 72 extends from resistor 37 to front contact 51*f* in slot 4*f* where it is pierced by tangs 56*f*, 58*f*, 62*f* and 64*f* for insulation displacement contact. Wire 74 extends from cable 26 to contact 52*r* in slot 5*r* where it joins wire segment 76 which extends first to common mode choke 35 and then to resistor 37. Wire segment 74 extends from resistor 37 to contact 52*f* in slot 5*f*. Wire 76 extends from cable 26 to contact 53*r* in slot 6*r* and then directly to contact 53*f* in slot 6*f*. Wire 78 extends from cable 26 to contact 54*r* in slot 7*r* and then directly to contact 54*f* in slot 7*f*. Wire 80 extend from cable 26 to contact 8*r*, and wire segment 82 extends from contact 8*r* to LED 34 and then to resistor 36. Wire segment 84 extends from resistor 36 to contact 55*f* in slot 8*f*.

Figure 3:
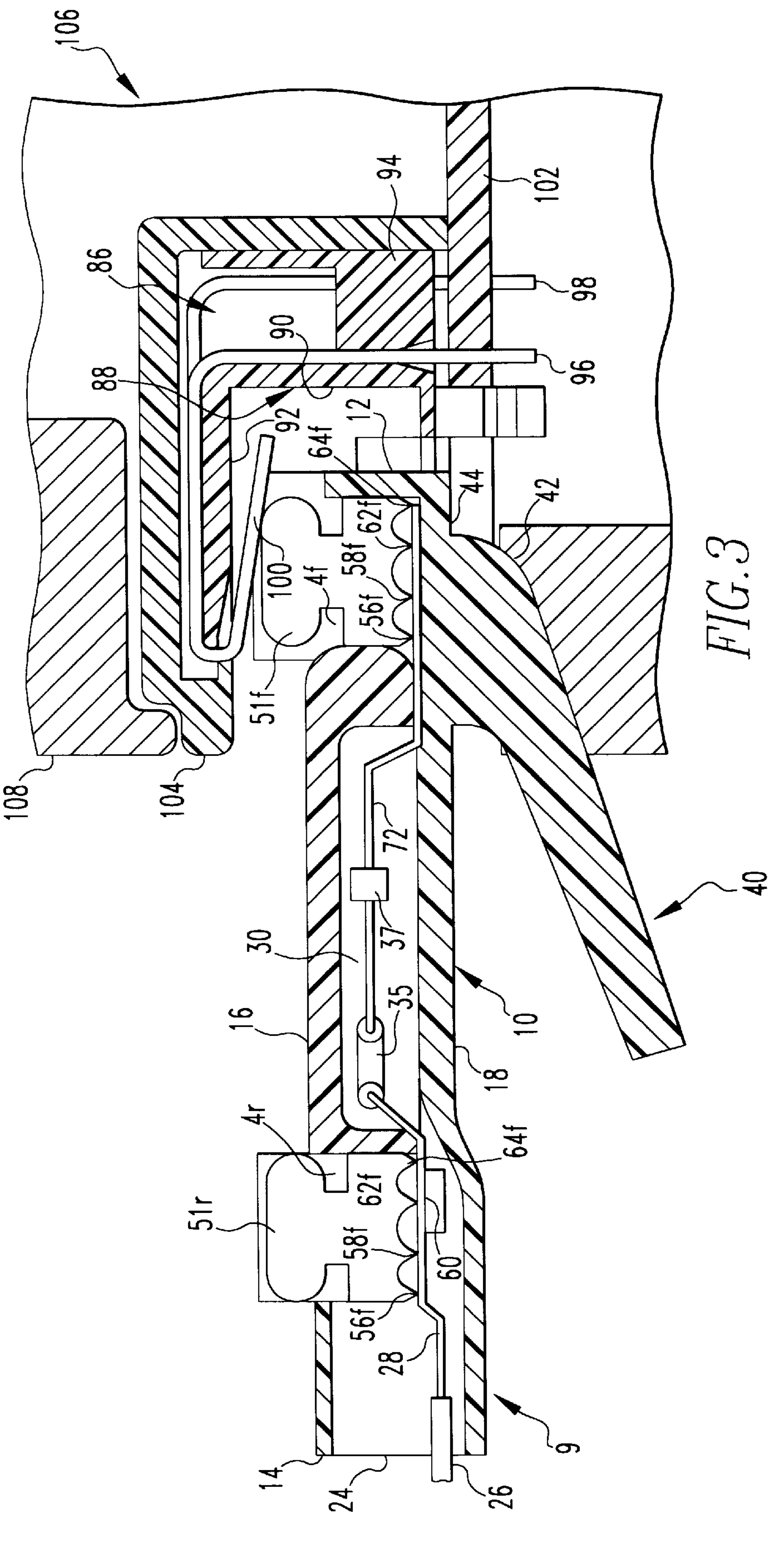
FIG. 3 is a view of the plug similar to FIG. 2 shown in combination with an article of electronic equipment.

Referring in particular to FIG. 3, the modular plug is shown engaged with a conventional modular jack shown generally at numeral 86. The plug has an insulative body 88 with a vertical section 90 and a horizontal section 92 and a rear insulative insert 94. Eight terminals as at terminals 96 and 98 extend first upwardly in then horizontally then obliquely downwardly and rearwardly toward the vertical section in contacts as at contact 100 which bear against the front contacts in the plug as at contact 51*f* in slot 4*f*. The jack is through mounted on PCB 102 having electronic circuitry including electronic components and in an insulative port or opening 104 in electronic equipment shown generally at numeral 106 which has external panel enclosure 108.

It will be appreciated that, in particular, the modular plug of the present invention allows for the reduction of EMI in the electronic equipment with which it is used.

It will also be appreciated that the modular plug of this invention allows for the improvement of the electronic equipment after such equipment had been designed and manufactured, and in some cases installed at the customer premises. Such a result can be achieved by incorporating the magnetic and other components into the modular plug.

It will also be appreciated that the modular plug of the present invention could be used to reduce load on the internal components of the electronic equipment with which it is used.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A modular plug comprising:

(a) an insulative housing comprising a front wall, a rear wall, a top wall, a bottom wall and a pair of lateral walls perpendicularly interposed between said top and bottom walls and wherein there are a plurality of front terminal contact receiving slots in the top wall adjacent the front wall, a cable receiving opening in the rear wall, a plurality of rear terminal contact receiving slots in the top wall and between the front terminal contact receiving slots and the rear wall, and a medial component housing cavity interposed between the front terminal contact receiving slots and the rear terminal contact receiving slots;

(b) a first plurality of conductive means wherein each of which conductive means extends from the cable receiving opening in the rear wall of insulative housing to adjacent one of said rear contact terminal receiving slots;

(c) a first plurality of terminal contacts each of which is positioned in a different one of said rear contact receiving slots and which is connected to a separate one of the first plurality of conductive means;

(d) a second plurality of terminal contacts each of which contacts is positioned in a different one of said front terminal contact receiving slots;

(e) at least one electronic component positioned in the medial component receiving cavity;

(f) a second plurality of conductive means each of which extends in a generally forward direction from a different one of the first plurality of terminal contacts and at least one of which connects one of the first plurality of terminal contacts with the electronic component; and (g) a third conductive means which extends in a generally rearward direction from one of the second plurality of terminal contacts and which connects one of the second plurality of terminal contacts with the electronic component.

2. The modular plug of claim 1 wherein at least one of the first and second plurality of contacts is comprised of a substantially planar blade.

3. The modular plug of claim 1 wherein the first conducting means is comprised of a plurality of electrical wires having insulation and a lower portion of each of the first plurality of contacts includes tangs for piercing the insulation.

4. The modular jack of claim 1 wherein the electronic components is a magnetic component.

5. The modular jack of claim 4 wherein the electronic component is a common mode choke.

6. The modular jack of claim 4 wherein the electronic component is a transformer.

7. The modular jack of claim 1 wherein the electronic component is a resistor.

8. The modular jack of claim 1 wherein the electronic component is a capacitor.

9. The modular plug of claim 1 wherein the electronic component is a light emitting diode (LED).

10. The modular plug of claim 1 wherein there are a plurality of electronic components in the medial component receiving cavity.

11. The modular plug of claim 1 wherein there are a plurality of electronic components.

12. The modular plug of claim 11 wherein one of the second plurality of conductive means connects each of the electronic components with one of the first plurality of terminal contacts.

13. The modular plug of claim 12 wherein the third conductive means is included in a third plurality of conductive means which extend rearwardly from at least some of the second plurality terminal contacts.

14. The modular plug of claim 13 wherein each one of the conductive means connects one of the second plurality of conductive terminals with one of the electronic components.

15. The modular jack of claim 14 wherein the electronic component is a magnetic component.

16. The modular jack of claim 15 wherein the electronic component is a common mode choke.

17. The modular jack of claim 15 wherein the electronic component is a transformer.

18. The modular jack of claim 14 wherein the electronic component is a resistor.

19. The modular jack of claim 14 wherein the electronic component is a capacitor.

20. The modular jack of claim 14 wherein the electronic component is a light emitting diode (LED).

21. A modular plug comprising:

(a) an insulative housing comprising a front wall, a rear wall, a top wall, a bottom wall and a pair of lateral walls perpendicularly interposed between said top and bottom walls and wherein there is at least one of front longitudinal terminal receiving slot in the top wall adjacent the front wall a cable receiving opening in the rear wall and between the front longitudinal terminal contact receiving slots and the rear wall, and a medial component housing cavity interposed between the front longitudinal terminal contact receiving slots and the rear wall;

(b) at least one electronic component positioned in the medial component receiving cavity;

(c) at least one terminal contact which is positioned in said front longitudinal terminal contact receiving slot;

(d) a first conductive means which connects terminal contacts with the cable receiving opening; and (e) a second conductive means which connects one of the electronic components with a different one of the second plurality of terminal contacts.

22. The modular plug of claim 21 wherein at least one of the contacts is comprised of a substantially planar blade.

23. The modular plug of claim 21 wherein the first conducting means is comprised of a plurality of electrical wires having insulation and a lower portion of the contact includes tangs for piercing the insulation.

24. The modular jack of claim 1 wherein the electronic components is a magnetic component.

25. The modular jack of claim 10 wherein the electronic component is a common mode choke.

26. The modular jack of claim 1 wherein the electronic component is a transformer.

27. The modular jack of claim 1 wherein the electronic component is a resistor.

28. The modular jack of claim 1 wherein the electronic component is a capacitor.

29. The modular plug of claim 1 wherein the electronic component is a light emitting diode.

30. A modular plug comprising:

(a) an insulative housing comprising a front wall, a rear wall, a top wall, a bottom wall and a pair of lateral walls perpendicularly interposed between said top and bottom walls and wherein there is a front terminal contact receiving slot in the top wall adjacent the front wall, a cable receiving opening in the rear wall, a rear terminal contact receiving slot in the top wall adjacent the rear wall and a medial component housing cavity interposed between the front terminal contact receiving slot and the rear terminal contact receiving slot;

(b) a first conductive means which extends from the cable receiving opening in the rear wall of the insulative housing to adjacent said rear contact terminal receiving slot;

(c) a first terminal contact positioned in a said rear contact receiving slot and which is connected to the first conductive means;

(d) a second terminal contact which is positioned in said front terminal contact receiving slot;

(e) an electronic component positioned in the medial component receiving cavity;

(f) a second conductive means which extends in a generally forward direction from the first terminal contact to connect the first terminal contact with the electronic component; and (g) a third conductive means which extends in a generally rearward direction from the second terminal contact to connect the second of terminal contact with the electronic component.

31. The modular jack of claim 30 wherein the electronic components is a magnetic component.

32. The modular jack of claim 31 wherein the electronic component is a common mode choke.

33. The modular jack of claim 31 wherein the electronic component is a transformer.

34. The modular jack of claim 30 wherein the electronic component is a resistor.

35. The modular jack of claim 30 wherein the electronic component is a capacitor.

36. The modular plug of claim 30 wherein the electronic component is a light emitting diode (LED).

* * * * *